Patented Mar. 17, 1942

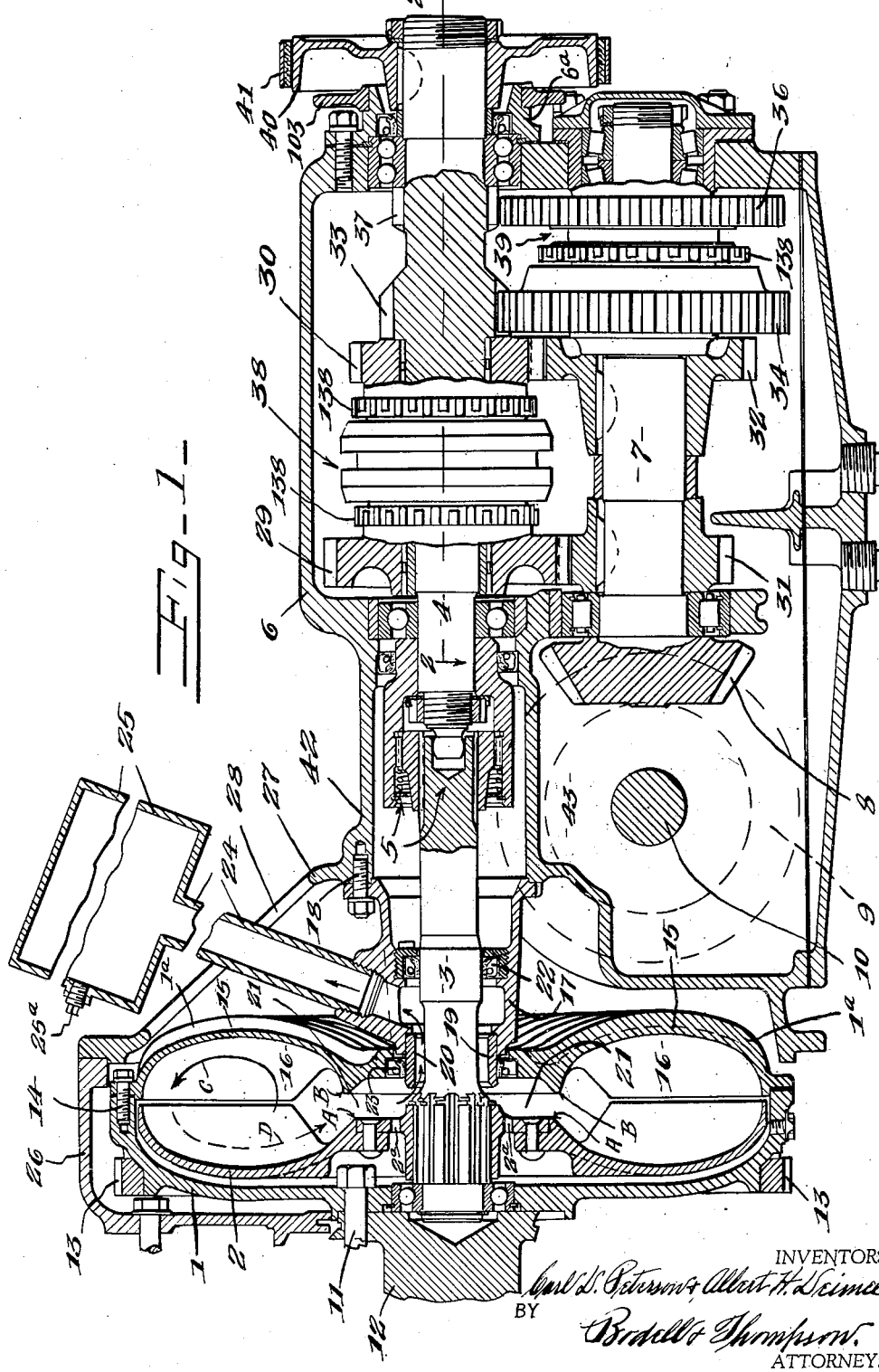

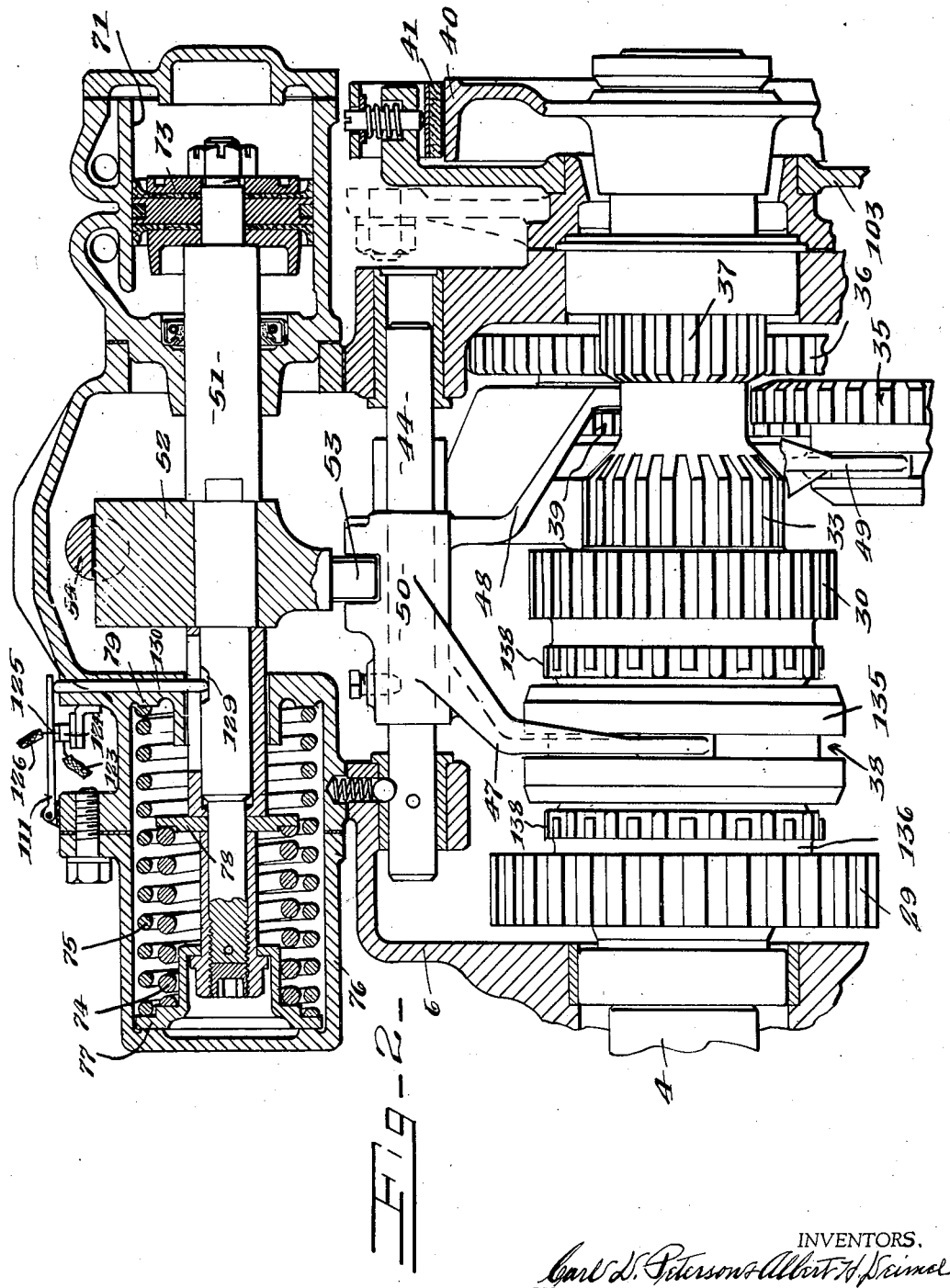

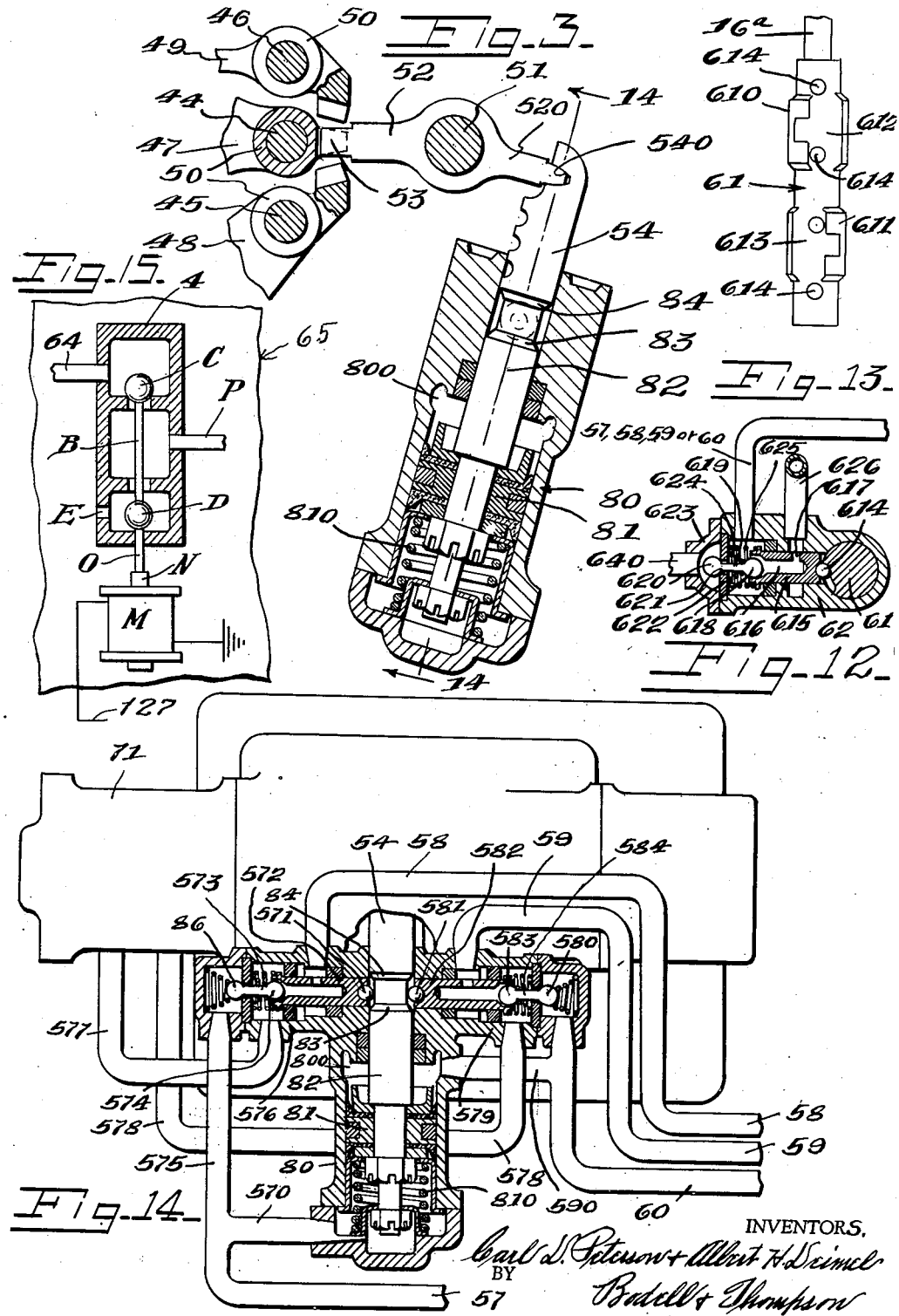

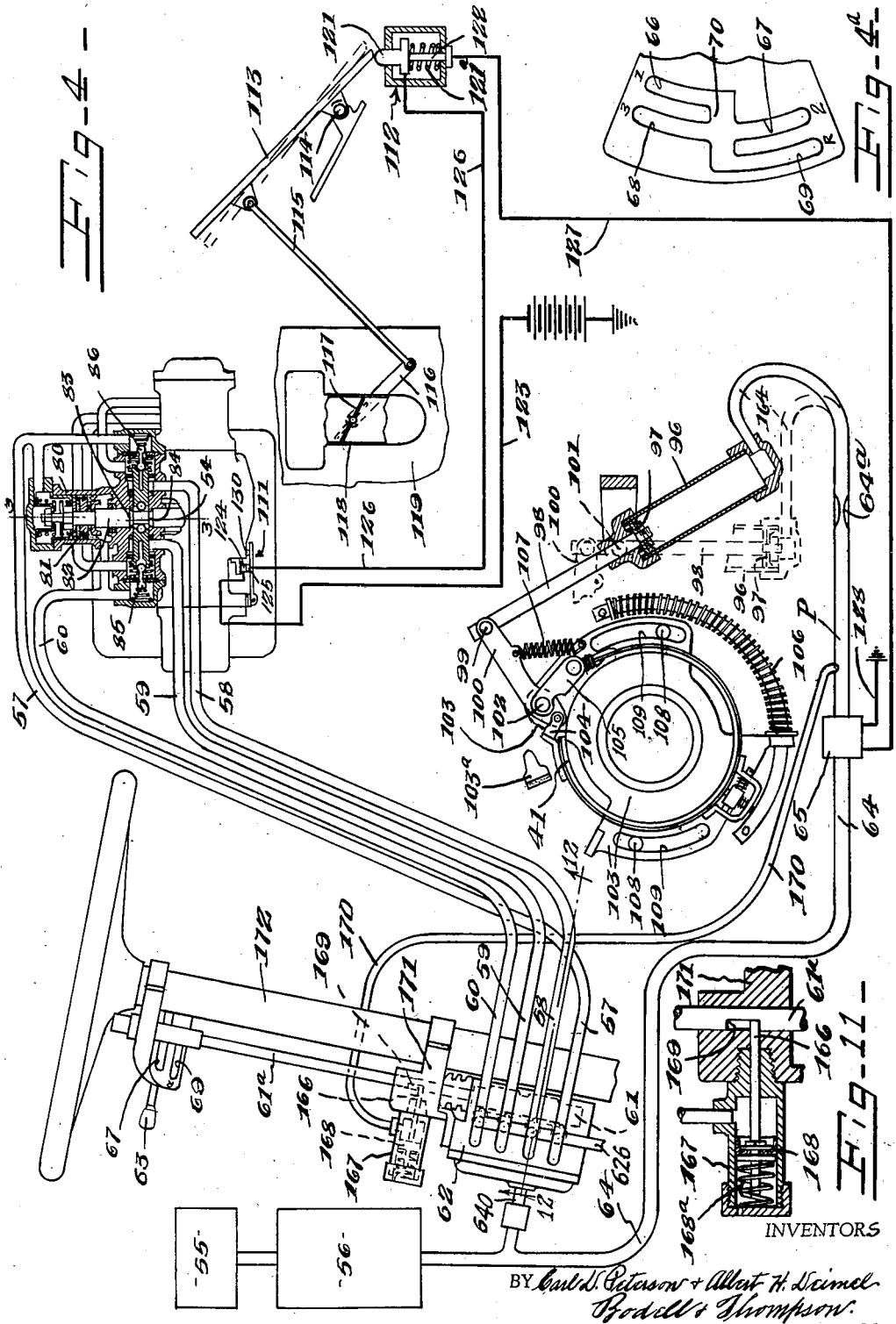

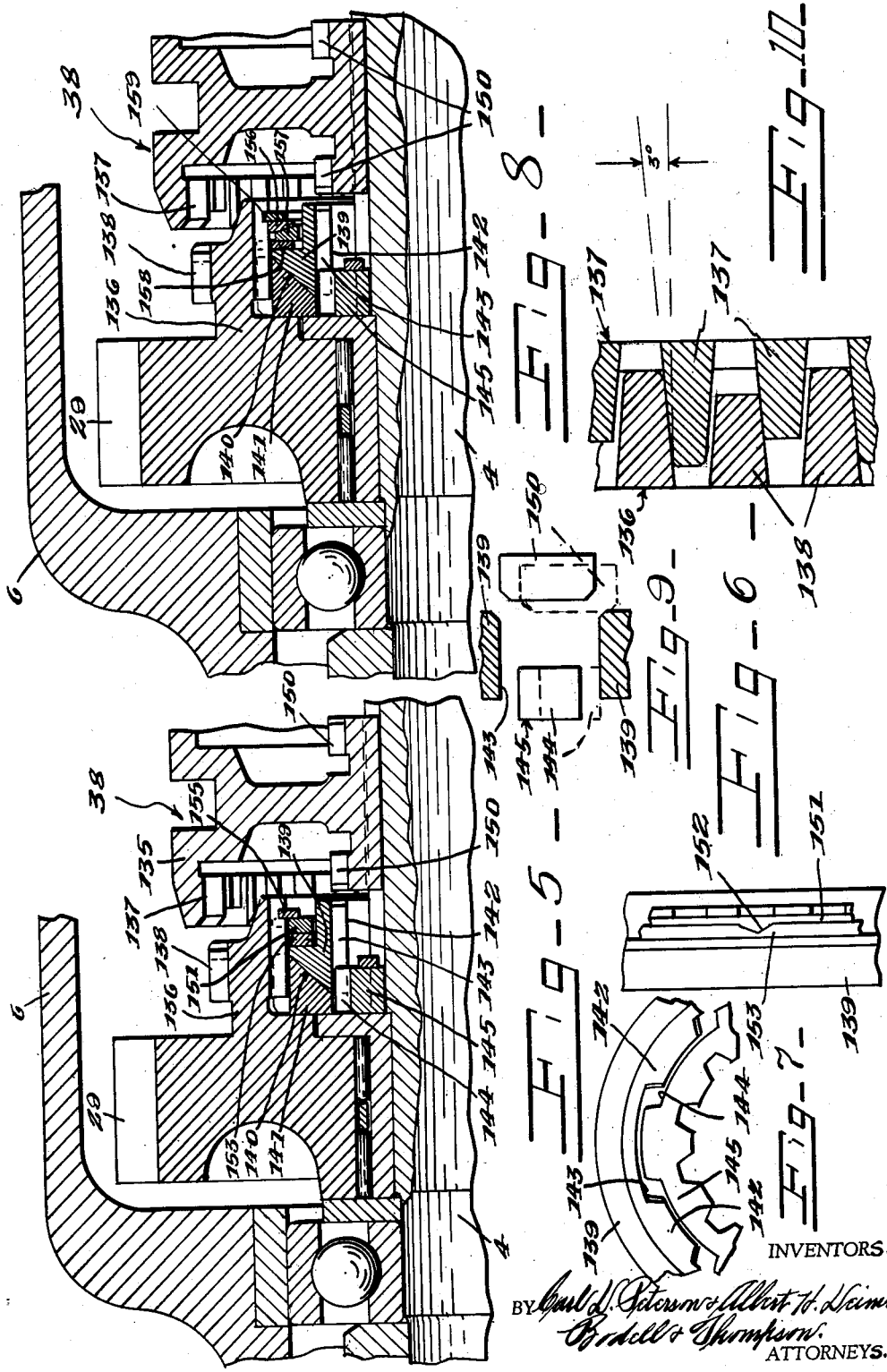

2,276,862

UNITED STATES PATENT OFFICE 2,276,862

TRANSMISSION MECHANISM

Carl D. Peterson and Albert H. Deimel,
Toledo, Ohio

Application November 28, 1939, Serial No. 306,526

10 Claims. (Cl. 192—.01)

This invention relates to transmission mechanisms embodying hydraulic couplings of the blade or vane type, and has for its object a unitary transmission mechanism, which is particularly compact, especially as to axial length.

It also has for its object a power control system for the unit, operable to control the transmission of power from the hydraulic coupling, the speed changes in the transmission gearing, and to control the unlocking of balking ring clutches in the gearing or effect the unlocking of the balking rings of the clutches, when the speeds of two elements, to be clutched together, cross.

It further has for its object such a power control system which also operates a brake for facilitating the crossing of the speeds of driving and driven parts to be clutched together, and hence the unlocking of balking rings of clutches embodied in the transmission gearing, preliminary to shifting of said clutches into engaged position, especially when the speed of the transmission shaft of the gearing is zero.

It also has for its object, means in the system and operated by the shifting-in operation of any one of the clutches for rendering inoperative or cutting out the control for operating the brake which, when operated, facilitates the crossing of the speeds.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view through the transmission mechanism.

Figure 2 is an enlarged fragmentary sectional view on line 2—2, Figure 1, parts being omitted.

Figure 3 is a detail sectional view illustrating the shift rods, the selector and the cylinder and piston for operating the selector, this view being taken on the plane of line 3—3, Figure 4.

Figure 4 is a diagrammatic view of the driver operated power shifting and control system.

Figure 4ª is a diagrammatic view illustrating the path of the driver operated selecting and shifting lever.

Figure 5 is an enlarged fragmentary sectional view of one of the balking ring clutches.

Figure 6 is a fragmentary edge view of the balking ring seen in Figure 5 and adjacent parts.

Figure 7 is a fragmentary elevation of the balking ring.

Figure 8 is a detail view of a modification of the balking ring clutches.

Figure 9 is a diagrammatic view showing the operation of the balking ring.

Figure 10 is an enlarged diagrammatic view illustrating the teeth or jaws of the clutches of the transmission gearing.

Figure 11 is a fragmentary sectional view of the cylinder and piston and adjacent parts for operating the lock which normally prevents selecting reverse gear.

Figure 12 is an enlarged sectional view taken on the plane of line 12—12, Figure 4.

Figure 13 is a diagrammatic view of the valve member shown in Figure 12.

Figure 14 is a detail view of the transfer valve mechanism taken approximately on the plane of line 14—14, Figure 3.

Figure 15 is a detail view of the control valve for the brake.

The transmission mechanism here illustrated comprises a hydraulic coupling of the blade or vane type, a change speed transmission gearing embodying balking ring type of clutches, coupled as a unit with the hydraulic coupling, a driver-controlled power-operated clutch selecting system for effecting gear changes or shifts, means, as a driver-controlled power-operated brake, to facilitate the crossing of the speeds of driving and driven clutch sections preliminary to shifting of the balking ring clutches, particularly when the speed of the transmission shaft of the gearing is zero, and means operable by the driver to rapidly slow down the engine of the vehicle and hence the driven member of the clutch, in order to speed up the time of shifting to a higher gear ratio, and when operated, to control the flow of power to the motor which operates the brake but only when the clutches are in neutral, so that this brake can not be used as a vehicle brake.

1 designates the impeller element of the hydraulic coupling, and 2 the driven or runner element. 3 designates a shaft on which the runner element 2 is mounted to rotate therewith, this being axially alined with the input shaft 4 of the transmission gearing and here shown as coupled thereto by a flexible coupling 5 of any suitable construction. The input shaft is mounted in a suitable gear box 6 and is connected through gears controlled by balking ring clutches to the output shaft 7, which is provided at its front end, that is, the end toward the coupling, with a gear 8 meshing with a similar gear 9 on the driven shaft 10 extending at an angle to the axis of the shaft 7 and also having bearings (not shown) in the gear box. The impeller element 1 encloses the runner element 2 and is suitably secured, as by bolts 11, to the engine or other shaft 12, so as to be actuated thereby. It is provided with a toothed ring 13 for coacting with the driving pinion of a starting mechanism for the engine. The impeller element is formed of front and rear sections suitably secured together, as by screws 14, and the rear section 15 is provided with blades 16 of the impeller element. The shaft 3 extends through a tubular support 17 projecting forwardly from the gear box 6 and here shown as secured thereto, as by screws 18, and the support is provided with a tubular wall 19 forming an annular passage 20 around the shaft 3 at the center of the hydraulic coupling, the passage communicating with the interior of the blade section of the impeller and runner elements through a radial annular passage 21. The support is provided with an annular transfer passage which communicates with the passage 20, the transfer passage being formed by a suitable oil tight partition or joint 22, for preventing the hydraulic fluid from passing along the shaft 3 into the gear box. Also, the rear section 15 of the hydraulic coupling has an oil tight seal 23 on the periphery of the tubular wall 19. The passage 20 communicates through a conduit 24 with an expansion tank or receptacle 25 located exterior of the coupling, and this tank is so constructed or is provided with means for carrying pressure greater than atmospheric to be applied to the fluid, when stored in the tank, as will be presently described. For this purpose, the tank is preferably closed or air-bound.

In operation, when the impeller element 1 and runner element 2 are both rotating, the hydraulic fluid passes in the usual vortex between the blades of the impeller element 1 and runner element 2. When, however, the runner element is stopped from rotation, the fluid kept in motion by the rotating impeller element passes inwardly radially through the passage 21, (it not being opposed by centrifugal force in the now non-rotating runner element) passage 20 through the conduit 24, which is comparatively large, into the expansion tank 25 and builds up a pressure therein until the pressure balances that created by the impeller element. When the runner element is stationary and the impeller element rotating, the impeller element is producing centrifugal force on the liquid. Since the runner element is not rotating, it offers no opposing centrifugal force, and therefore the fluid flows radially inward. It passes radially inward, or is expelled from the coupling, through the passages 21, 20, the conduit 24 into the tank 25. This creates a void in the outer annular portion of the blade space of the coupling. With the impeller element rotating at a certain speed, a certain centrifugal force is produced at the outer diameter or rim of the impeller. If a void or vacuum is produced at the intake or center of the impeller, the pressure produced by the centrifugal force is reduced, as the impeller produces a certain pressure or head at a certain speed, and this head produces the differences in pressure at the center zone or inner diameter and the rim or outer diameter of the coupling. Upon a reduction in pressure at the center of the coupling, the pressure will be correspondingly reduced at the rim or outer diameter so that the two pressures counteract each other and fluid will pass out of the coupling until the pressure or head produced by the impeller balances the pressure at the rim and center portions of the coupling. In other words, for a certain speed, the impeller element with the runner element stationary, a certain quantity of fluid will be expelled from the coupling into the tank. By making the tank larger, more fluid must be expelled to build up the same back pressure, but as more and more fluid is expelled, the pressure or head created by the impeller is reduced, so that a new condition or balance is established. Similar conditions are created when the runner element is rotating slowly. With the runner element rotating slowly, a certain amount of back centrifugal force is built up by the runner element, but if the difference between the centrifugal force created by the impeller element and the back centrifugal force created by the runner element is relatively large, in favor of the impeller element, the hydraulic fluid will still be expelled into the tank and the balancing conditions take place. Thus, not only is the fluid expelled from the coupling, when the impeller element is stationary, but also the fluid is gradually fed back into the coupling, as the speed of the runner element increases. After the speed of the runner element increases to a certain point, with relation to the speed of the impeller element, the centrifugal force develops to such a degree that there is no pressure exerted on the tank, but actually a void created at the centers of both impeller and runner elements. In other words, a vacuum is created at the center of both the rotating impeller and runner elements, so that all the fluid is drawn back into the coupling, and the coupling runs full. This return action of the fluid is greatly facilitated by the pressure on the fluid within the tank 25. Thus, the slip between the impeller and runner elements is quickly reduced the required amount for high-speed operation. Preferably, in order to most efficiently conduct the fluid to the pipe 24 and tank 25, the inner diameter of the blades of the driven element is less than the corresponding diameter of the blades of the impeller element, that is, the diameter between the point A (Figure 1) and to the axis of the shaft 3 is less than the diameter from the point B to the axis of the shaft. The path or vortex of the hydraulic fluid, when both the impeller and runner elements are rotating is indicated by arrows C in full lines, and the path taken by the fluid, when the runner element is held stationary is indicated by the arrow D in dotted lines (Figure 1).

The tank 25 is provided with a suitable filler plug 25a located at a certain height and limiting the amount of oil that can be poured into the tank. The tank is air-bound or with no opening above the filler plug, and therefore the space above the level of the filler plug acts as an air dome. The size of the air dome for any particular installation may be varied to suit by changing the level of the filler plug.

This construction of the hydraulic coupling eliminates one difficulty or objection to the use of hydraulic couplings, due to the fact that, in order to have a low slip and a high efficiency in operation at full speed, it is necessary to have a coupling of large diameter. This results in high drive torque at idling speed of the engine, which is objectionable. One method heretofore used to avoid this difficulty or objection was to provide a coupling with a chamber at the hub. The fluid under stall and idling conditions flows into this hub chamber, and due to the partial emptying of the blade section, the drag or stall torque at a certain speed is reduced. With both impeller and runner elements rotating, the fluid is thrown out of the hub into the blade section by the centrifugal force. The objection to this large chamber in the hub is that the axial length of the coupling is greatly increased, and in automotive work, compactness as to axial length is a desideratum. The coupling should be full of liquid when operating at high speed and with a chamber in the hub it is not possible to fill the coupling.

By the use of the external expansion tank and the arrangement of the passages 20, 21, the axial length is in a unitary structure not appreciably or objectionably increased, and the transmission unit is compact. Owing to the building up of the air pressure in an expansion tank, the return of the fluid to the coupling is quickly accomplished. By varying the filling of the tank and thereby the air space or by varying the size of the tank or the space within the same, the time of emptying and filling the coupling between idling or stall and speed conditions, may be conveniently varied to suit the conditions in the particular installation. This effect may also be modified by varying the diameter of the pipe 24 or by means of a choke or valve or the amount of pressure built up in a tank may be varied in any suitable manner to suit conditions.

The underlying idea is that when idling, the fluid pumped by the impeller element from the coupling builds up a predetermined minimum pressure which, with the vacuum created by the coupling, facilitates the return of the fluid from the expansion tank to the coupling and the quick refilling of the coupling, when the runner element is released and free to rotate. The result of the correlation of these features is a coupling of comparable small diameter having low slip and high efficiency.

The coupling is enclosed in a suitable housing 26 and the bell housing 27 on the front end of the gear box 6. This may be provided with a suitable ventilating opening 28. Also, the housing 26 may be provided with a ventilating opening, so that during the rotation of the coupling, the coupling is cooled by circulating air. For facilitating the circulation of air, the impeller element may be formed with external vanes 1a.

The runner element 2 is provided with holes or passages 2a near the center thereof opening into the space between it and the front wall of the impeller element 1. These holes are for the purpose of reducing the end thrust on the runner element, due to differences in pressure on opposite sides of the element or the holes tend to balance the thrust on the runner element. These holes 2a are in effect equalizing holes, as without the holes, maximum fluid pressure would exist throughout the full diameter of the runner element. By having the holes 2a, the pressure in back or outside of the runner element is reduced more nearly to that existing between the impeller and runner elements. The holes may be conveniently located anywhere between the center of the blade space and the axis of the runner element.

The gearing includes gears 29 and 30 mounted on the input shaft 4 and normally rotatable about the same and clutchable thereto, gears 31, 32 which are keyed to the output shaft 7 and mesh with the gears 29, 30, intermeshing gears 33, 34 on the input shaft and output shaft 4 and 7 respectively, the gear 33 being rotatable with the input shaft 4 and the gear 34 rotatable relatively to the output shaft 7 and clutchable thereto. Clutching of the gear 34 to the output shaft 7 effects first speed forward; clutching of the gear 30 to the input shaft 4 effects second speed forward; clutching of the gear 29 to the input shaft 4 effects third speed forward.

Reverse speed is here shown as effected by shifting an idler or intermediary gear 35 suitably mounted on a stud or shaft in the gear box, into mesh with the gear 37 on the input shaft and the gear 36 on the output shaft. In Figure 2, the intermediary or reverse idler is shown, for the purpose of illustration, displaced.

The gears 29, 30 are clutched to the input shaft 4 through a double balking ring clutch 38 shiftable in one direction from neutral to clutch the gear 29 to the input shaft 4 and in the opposite direction from neutral to clutch the gear 30 to the input shaft 4. Gear 34 is clutchable to the output shaft 7 by a balking ring clutch 39 of single construction shiftable to clutch the gear 34 to the output shaft 7. The balking ring clutches and the mechanism for selecting and shifting them will be hereinafter described.

The brake means operable to stop the rotation of the runner element 2 and also to effect reverse rotation thereof to effect crossing of the speeds and unlock the balking ring clutches, when in neutral or rest, is mounted on the rear end of the input shaft 4 outside of the gear box and at the rear end thereof. This clutch consists of a brake drum 40 mounted on the rear end of the input shaft 4, a brake band 41 coacting with the brake drum, and power means for operating the brake band 41. The power means will be hereinafter described.

The gear box, in addition to the portion thereof in which the gears are located, includes a forwardly extending portion 42 in which the coupling 5 between the shafts 3, 4 is located, and also a compartment 43 in which the gears 8 and 9 and shaft 10 are located. The entire arrangement of the gear box, hydraulic coupling and housing therefor, including the bell housing 27, results in a particularly compact, short-coupled assembly, and also owing to the arrangement of the input and output shafts, the brake for effecting crossing of the speeds to permit a balking ring clutch to engage, is located in such position, as to not materially increase the axial length, in contradistinction to installations where the brake is located adjacent the hydraulic coupling.

The clutches 38 and 39 and the reverse gear 36 are here shown as shifted respectively by shift rods 44, 45, 46 slidably mounted in the gear box and having forks 47, 48, 49 coacting respectively therewith, each fork having a hub or block, as 50, on its companion shift rod, and these blocks being formed with transverse slots, which are arranged in alinement when the clutches and the reverse gear are in neutral position. The rods 44, 45, 46 are here shown as shifted by an axially movable shaft 51 also mounted in the gear box or cover thereof and selected by a rocking member 52 on the shaft 51 and having a selecting finger 53 shiftable into individual engagement with the notches of any of the blocks 50. The rocking member is operated by a selector 54 to be presently described. The finger 53 is normally arranged in the slot of the block on the shift rod 44 which operates the clutch 38 to produce second or third speed forward, and is shiftable transversely in one direction from neutral to select the rod 45, which operates the clutch 39, and in the other direction to select the reverse speed rod 46. The member 52 is operated in its selecting movement, and also the shaft 51 is moved axially by a driver-controlled power system.

The system includes a source of power, as a source of compressed air, including a compresser 55, a compressed air tank 56, branch conduits 57, 58, 59 and 60 leading to pressure-operated motors, as cylinders and pistons, for operating the selecting member 52 and the shaft 51, a driver-operated selecting valve-operating member or cam 61 located in a valve casing 62 common to all the branch conduits and having valves therein individual to said conduits, a driver-operated member or lever 63 for operating the valve-operating member 61, and also a branch conduit 64 which leads to a pressure-operated motor, which operates the brake band 41, the conduit branch 64 having a normally-closed two-way driver-operated control valve therein.

The lever 63 has a selecting and shifting movement in a path illustrated in Figure 4ª, in which 66 designates the first speed gear slot, 67 the second speed gear slot, 68 the third speed gear slot, and 69 the reverse slot. 70 designates the neutral or cross-over slot.

The pressure-operated motor for actuating the shaft 51 is here shown as a cylinder 71 (Figure 2), a piston 73 therein mounted on the shaft 51, the piston being movable in opposite directions by power, but when shifted in either direction by power, is returned to its normal central position by a spring, when the power or air is free to exhaust from the cylinder on the pressure side of the piston.

In Figure 2, movement of the piston 73 to the left is against the action of a returning spring 74, and movement of the piston 73 to the right from neutral position is against the action of a returning spring 75. The spring 74 is of greater strength than the spring 75, for the reason that the area of the piston face on the right side of the piston 73 is greater than that of the face on the left side of the piston (Figure 2). The springs are located in a cylinderlike housing 76, and the springs 74 and 75 are interposed between an abutment 77 on the end of the shaft 51 opposite to that on which the piston is located and, respectively, a second abutment 78 on the shaft 51 and an abutment at 79 at the inner end of the casing 76.

Movement of the piston 73 and shaft 51 to the left (Figure 2) causes the abutment 78 to compress the spring 74, so that when air is released from the right hand end of the cylinder 71, the spring 74 will re-act and return the piston 73 to its central position. When the piston 73 and the shaft 51 are moved to the right from central position, the abutment 77 compresses the spring 75, but at the same time, the abutment 78, and hence the spring 74 rides along to the right with the rod 51. The spring 75 is thus compressed and returns the piston 73 to the left to its central position, when the air is exhausted from the left end of the cylinder 71.

The valve member 61, which is operated by the selecting lever 63, is shown in Figures 12 and 13, the valve casing and valve mechanism being shown in Figure 12 in cross section. The valve operating member or cam 61 within the valve casing 62 is provided with raised portions 610, 611 formed with depressions 612, 613, the opposite side walls of which constitute lift portions arranged to act on balls, as the ball 614 (Figure 12), each of which balls thrusts against a plunger 615 slidable in the valve casing 62 and having a lengthwise passage 616 opening through the end of the plunger remote from the ball 614 and also having a laterally extending port 617. The open end of the passage 616 is provided with a valve seat with which coacts the exhaust head 618 of what in effect is a two-way valve 619. The head 618 is connected to an intake valve head 620 to move in unison therewith. The intake valve head 620 controls an intake port 621 in a wall or partition 622 between a header 623 of the valve casing 62 and the body of the valve casing. The combined intake and exhaust two-way valve is here shown in the general form of a dumb-bell. A suitable spring 624 acts on each combined intake and exhaust valve and tends to close the intake valve 620. When the intake valve head is closed, the exhaust valve head is open. An additional spring 625 acts on the plunger or slide 615 tending to press the ball 614 against the cam 61. The port 617 of the plunger or slide 615 communicates with an exhaust pipe 626. There is a valve mechanism including a plunger or slide 615 and a combined intake and exhaust valve 619 for each conduit 57 to 60 inclusive.

Upon the selecting movement of the lever 63 in the cross-over slot 70, the cam or valve member 61 is shifted axially or endwise so that the ball 614 of the selected valve is in position to be lifted by the cam, when the hand lever is rocked fore or aft, and upon such rocking, the ball 614 is moved, to the left (Figure 12) sliding the plunger or slide 615 to move the exhaust port 617 out of alinement with the exhaust pipe 626, pressing the seat of the exhaust valve head 618 against the exhaust valve head, and moving the combined intake and exhaust valve to the left, thus opening the intake valve head 620, so that the air flows from the conduit 64 through the conduit 640 into the header 623 past the selected open intake valve head 620 and through the selected conduit 57 to 60 inclusive, to the power selector valve casing 80, and thence through the transfer valve mechanism to the cylinder 71 to actuate the piston 73 in one direction or the other. As all the other valves in the casing 62 are in starting position, or the position shown in Figure 12, the air in any unselected conduit 57 to 60 inclusive, is free to exhaust back through the valve casing 62, passage or port 617 to exhaust pipe 626. The relative spacing of the balls 614 is indicated in Figure 13.

The casing 80 of the power selector is formed with a piston chamber 800 in which the piston 81 moves, the piston rod terminating in the transversely movable selector 54 which has a notch 540 coacting with a tooth on the end of a radial arm 520 on the rocking member 52. The other serrations or notches in the selector 54 are for the purpose of coacting with a ratchet, not shown, and forming no part of the invention. The piston rod 82 or selector 54 is formed to operate transfer valves or valve gear for transferring the flow of fluid from either side to the other of the piston 73. These valves will now be described in connection with the operation of the selector 54. The construction, however, forms no part of the invention.

Assuming that the hand lever 63 is operated to effect first speed, the selecting movement positions the valve member or cam 61 to operate the valve in the casing 62, so that when the hand lever is rocked backwardly into the slot 66, the valve in conduit 57 is opened, so that air flows through the conduit 57 and through branch conduit 570 into the cylinder chamber 800 on the outer side of the piston 81, that is, the side remote from the gear box, and actuates the piston 81 inward or upward (Figures 3 and 14) against the action of a spring 810, causing the lift surface 83 on the piston rod 82 to thrust against the ball or follower 571 to move the slide or plunger 572 to the left (Figure 14) or to the right (Figure 4) and operate the two-way or combined intake and exhaust valve or dumb-bell valve 573 to close the exhaust valve head 574 and open the intake head 86, so that now the air can pass from pipe 57 through branch 575 into the valve casing 576 past the open intake valve head or ball 86 and thence through pipe 577 to the left end of the cylinder 71 (Figure 14) or right end (Figure 2) to actuate the piston 73 therein to the right (Figure 14) or to the left (Figure 2) to effect the shifting of the first speed clutch 35 operated by the fork 48 into engaged position. The air on the other or right hand side of the piston 73 (Figure 14) is free to exhaust through pipe 578 into valve casing 579 past exhaust valve head 580, which is open, and out through pipe 60. During the shifting of the piston 81, the lift portion 83 also thrusts against the ball or follower 581 thrusting plunger or slide 582 to the right (Figure 14) opening the intake valve head 850 of the dumb-bell or two-way valve 584 so that communication is established between the pipe 578 and the pipe or conduit 60, which, because of the position of the valves in the valve casing 62, is free to exhaust through the exhaust pipe 626.

Upon shifting of the hand lever 63 back to neutral, or to the cross-over slot 70, the valve member or cam 61 is rocked to permit the valve therein controlling the conduit 57 to close, and hence open it to the exhaust of the left hand end of the cylinder 71 (Figure 14) and from the outer end of the cylinder chamber 800 of the transfer valve mechanism 80. The piston 81 is thus restored to neutral or central position by the spring 810.

Assuming that the shifting lever is shifted forward into the second speed slot 67, the valve 61 in the casing 62 controlling the conduit 59 is opened, permitting air to pass through the conduit 59 to the hollow plunger 582 past valve head 583 thence through transfer pipe 578 to the right end (Figure 14) of the cylinder 71 or left end (Figure 2) and actuate the piston 73, and hence the shaft 51 and the selected shift rod to the right (Figure 2).

Now assuming that the shift is made to the third speed, the hand lever 63 is moved from the second speed slot rearward into the third speed slot and in so doing, the valve or cam member 61 in the valve casing 62 which controls the third speed conduit 58 is opened by the cam 61, so that air passes from the source through the valve casing 62, conduit 58, through the hollow plunger 572, past the open head 574 of the dumb-bell valve 573; thence through pipe 577 to the left hand end (Figure 14) of the cylinder 71 or to the right end (Figure 2) to actuate the piston 73 to the right (Figure 14) or left (Figure 2), the air on the other side of the piston 73 being free to pass out through transfer pipe 578 past the dumb-bell valve 584, the head 583 of which is in open position, out through the hollow plunger 582 and out through pipe 59 to valve casing 62 and through exhaust pipe 626.

To shift into reverse, the hand lever 63 is shifted into the reverse slot 69 from neutral, thus operating the valve member or cam 61 in the valve casing 62 which controls the reverse conduit 60, permitting air to flow therethrough and through branch 590 into the inner end of the cylinder chamber 800 on the upper side thereof (Figures 3 and 14) or the lower side (Figure 4) and actuate the piston 81 outward, causing the lift surface 84 to act on the balls 581 and 571 to thrust the hollow plungers or slides 572 and 582 outward, thus opening the intake valve head 86 of the two-way or dumb-bell valve 573 and closing the exhaust valve head 574 thereof and effect the same operation of the two-way or dumb-bell valve 584 through the slide or plunger 582, so that the air can pass from pipe 60 through valve casing 579 and transfer pipe 578 to the right end of the cylinder 71 (Figure 14) or left end (Figure 2) to actuate the piston 73 to the right (Figure 2), the air exhausting from the other end of the cylinder 71 through the pipe 577, valve casing 576, past the dumb-bell valve 573, the intake ball 86 of which is open, and then out through branch pipe 575, through pipe 57 to the valve casing 62 out through the exhaust pipe 626. Movement of the piston 81 of the transfer valve mechanism rocks the selector 52 to cause the finger 53 thereof to select any one of the rods 44, 45 and 46. After being actuated in either direction by air pressure, the piston 73 is returned to central position in the cylinder 71 by one or the other of the springs 74, 75 when the air pressure tending to hold the piston shifted is released.

The specific construction of the valves forms no part of this invention, and in so far as this invention is concerned, they are merely two-way valves forming part of the transfer mechanism operated by the pressure-operated motor controlled by the shifting lever to transfer or bypass the air under pressure from either side of the power piston 73 which effects the shifts, and the outlet of air from the other side of the piston. This operation takes place when the piston 81 of the transfer mechanism is operated to select the shift rod to be shifted preliminary to the shifting of said rod by the piston 73.

The selector 54 is operated by a pressure-operated or cylinder and piston motor, the air to which is supplied through one of the branch pipes 57, 58, 59, 60, and the cylinder and piston motor also operates the valve gear which controls the flow of air to either side of the piston 73 and the exhaust of air from the other side thereof. This cylinder and piston motor is shown in Figure 3 and diagrammatically in Figure 4, and the valve gear is also shown diagrammatically, and 80 designates the cylinder; 81 the piston therein mounted on the rod 82, the end portion of which constitutes the selector 54. The rod is formed with cam lifts 83 and 84 which operate two-way valves designated generally 85 and 86. The valves 85 and 86 control the flow of air to either end of the cylinder 71, and the exhaust of air from the other end back through the unselected pipes 57 to 60 inclusive, the valves in the casing 62 are in effect two-way valves normally closing the conduits 57 to 60 inclusive to the flow of air from the reservoir 56 through the branch conduits to the exhaust of air.

Selecting movement of the lever 63 in the cross-over slot 70 positions the cam or valve operating member 61 to select the valve in the casing 62 which controls one of the conduits 57, 58, 59, 60 and rocking or fore and aft movement of the lever along any one of the slots or paths opens the valve in the selected conduit 57 to 60 inclusive, so that the air passes therethrough to selectively operate the piston 81 of the power selector to select the shift rods 44, 45 or 46 and position the valves 85, 86 and then to flow to one end or the other of the cylinder 71 to actuate the piston 73 in one direction or the other to shift the selected shift rod.

The selecting finger 53 is normally engaged with the shift rod 44, when the lever 63 is in neutral, and therefore, the shift from neutral into slots 67, 68, which are the second and third speeds slots, and no preliminary selecting movement is necessary.

The construction of the valves in the casing 62 and the selector, cylinder, piston and valve gear per se form no part of this invention.

The fluid-operated motor for applying the brake band 41 is also shown as a cylinder and piston motor; 96 designating the cylinder; 97 the piston therein having its rod 98 pivoted at 99 to the operating lever 100 for the brake band. The cylinder is here shown as an oscillating one, it being pivoted at 101 to any fixed point. The valve 65 in the conduit 64 leading from the source of supply or reservoir 56 to the cylinder 96 is normally closed, and when operated to open position, permits the air to exhaust from the cylinder through the section of the pipe 64 between the valve 65 and the cylinder 96 to the outer air through the valve 65. The lever 100 is pivoted at 102 to a carrier 103 (Figures 1 and 4) capable of rocking about the shaft 4, and has an arm connected by a link 104 to one end of the brake band, the other end of the brake band being connected by link 105 to the lever 100 and axis thereof. The rocking of the carrier 103 is against the action of a suitable returning spring 106, and the pivotal movement of the lever 100 is against the action of a returning spring 107. The rocking movement of the carrier 103 is limited, as by a pin or stop 108 fixed relatively to the carrier, it being carried by a part fixed with the gear box 6 and extending into an arcuate slot 109 in the carrier. The end walls of the slot constitute stops for limiting the rocking movement of the carrier. A buffer 103ª limits the return movement of the carrier by the spring 106 in starting position or prevents overthrowing of the carrier beyond starting position. The buffer is suitably carried by the gear box.

The carrier 103 is in the general form of a disk having a hub portion, as seen in Figure 1, mounted to rock about a bearing surface on a bearing cap 6ª at the rear end of the gear box 6, and located concentric with the output shaft 4 adjacent the brake drum 40. The portions formed with the slots 109 are radially extending web or segmental portions extending beyond the brake band 41, one of these being formed with a stop normally coacting with the stop shoulder 103ª on the gear box. The link 105 which is pivoted at one end at 102 to the lever 100 is pivoted at its other end to one end of the radially extending or segmental portion, as seen in Figure 4. The construction is such that initial pressure applied to the lever 100 from the piston rod 98 first rocks the lever 100 about its pivot 102 and contracts the brake band on the brake drum to retard the rotation of the shaft 4 and finally stop the shaft, so that then the pressure on the lever 100 causes the contracting brake band to rock, bringing the stop 103ᵇ away from the stop 103ª into the position shown in Figure 4. In Figure 4, the brake drum and the transmission shaft are omitted. In so far as this invention is concerned, any form of rocking brake mechanism may be used to perform the function of unlocking the balking ring.

The pipe 64 between the electrically operated valve 65 and the cylinder 96 is preferably provided with a restricted or choke portion at 64ª, this being for the purpose of limiting the force applied by the brake band 41 to the required degree for slowing down the engine or the input shaft 4, or, in other words, the choke regulates the force necessary to be applied by the brake band.

When the valve 65 is open, and air enters the cylinder 96 and actuates the piston 97 therein, the lever 100 is moved about its pivot from dotted line position (Figure 4) and first applies the brake band 41 to the drum 40, and thus first stops the rotation of the shaft 4 which may be idling with the runner element 2 of the hydraulic coupling, when the clutches of the transmission gear are in neutral, and then additional movement of the carrier rocks the shaft 4 in the reverse direction, effecting the crossing of the speeds, so that the balking ring clutches may inter-engage, as will be presently described in connection with the balking ring clutches.

The leverage of the arm 100 is such that the torque (about the axis of the shaft 4) on the rocking carrier, due to the friction component, and the brake band applied to the brake drum, is greater than the torque applied to the brake drum through the brake band by the pressure in the cylinder 96 to the piston 97 to the lever 100, minus the torque caused by the pressure of the spring 106. In other words, as long as the brake drum is slipping, no rocking action of the carrier can take place. As the brake drum is stopped from slipping relative to the brake band by the braking action of the brake band, then the torque or force applied by the pressure in the cylinder 96 to the piston 97 and to the lever arm 100 is great enough to overcome the idling torque of the runner element of the coupling, and rocking the input shaft 4 of the runner element 2 in the reverse direction takes place.

One of the features of this invention is means operated by the shifting operation of the clutches 38, 39 or any of the shift rods 44, 45, 46 to open the valve 65 to the flow of air through the conduit 64 to the brake cylinder 96 and to automatically close said valve 65 to the flow of air to the cylinder 96 to open it to the exhaust of air from the cylinder 96, when any one of the shift rods is being shifted axially.

The invention also includes an operator control for rapidly decelerating the engine when making a shift to a higher gear ratio, the operation of this control also controlling the valve 65 or the control of air through the conduit 64 to the brake cylinder 96, the valve 65 being immediately operated to release the brake. Upon initial axial movement of any one of the shift rods 44, 45 or 46 out of neutral position, that is, the position it assumes when it is locked by the balking ring of the selected clutch, until the speeds cross, and thus when any one of the shift rods is in operated position, this brake can not be used as a vehicle brake, but is usable only as a brake to effect the crossing of the speeds, so that the balking ring clutches may engage when a start is being made from central or neutral position into any gear, or when a shift is being made to a higher gear, the brake in this instance, speeding up the time the speeds cross.

The valve 65 is electrically operated from normally-closed position to open position, and the opening of the valve is controlled by a switch, which is closed, when the shift rods 44, 45, 46 are in neutral position and opened by the shifting of any one of the rods out of neutral zone. There is another switch in series with the former switch, this latter switch being normally open but operable to closed position by the engine throttle control, as the foot accelerator, when the foot accelerator is moved beyond, in a retrograde direction, the position it normally occupies when the engine is idling.

111 designates one of the switches in the circuit for the electro-magnetically operated valve 65. 112 designates a normally open switch in series with the switch 111, and the electro-magnetically operated valve 65.

113 designates a foot accelerator pivoted at 114 to the floor board of the vehicle and connected in any suitable manner, as by a link 115 to a rock arm 116 on the spindle of the throttle 117 in the outlet of the carburetor 118 for the vehicle engine 119. The spring 121ª acting on the contact 121, to hold it separated from the stop 122, acts as a yielding stop to hold the accelerated pedal in engine idling position.

In Figure 4, the normal idling position of the parts is shown in dotted lines, and the shifting beyond normal position in full lines. When the accelerator pedal is moved to the full line position (Figure 4), it depresses one contact 121 of the switch 112 into engagement with the other contact 122, thus closing the circuit to the electro-magnetically operated switch 65. If the shift rods 44, 45, 46 are in neutral position, the flow of current is as follows: From the source through wire 123 to contact 124 of switch 111 to the other contact 125 thereof, through wire 126, thence through the closed contacts 121, 122 of the switch 112, thence through wire 127 to the electro-magnet of the valve 65 through said magnet to grounded wire 128. When, however, the selected shift rod is moved from neutral position, the contacts 124, 125 will be separated, thus breaking the circuit, so that the valve 65 returns to its normal position in which it closes the conduit 64 to the flow of air to the cylinder 96 and opens said conduit to the exhaust of air from the cylinder 96. The switch 111 is suitably mounted on the gear box, as seen in Figure 2, and the contact 125, or the spring arm on which it is mounted, is operated by a cam depression 129 (Figure 2) in the axially movable shaft 51, which is common to all three shift rods. When this shaft 51 is shifted axially in one direction or the other, hence the selected shift rod 43, 44 or 45 shifted in one direction or the other, one end or the other of the depression 129 actuates the push rod 130, which thrusts against the spring arm carrying the contact 125, and thus separates the contacts 124, 125. Thus, whenever the brake is used to cross the speeds, the brake is immediately released, when the speeds have crossed and the shift permitted, due to the unlocking of the balking ring clutches.

The opening of the valve 65 when the pedal 113 is depressed in a retrograde direction beyond its normal position, that is, depressed to the full line position (Figure 4), to close the circuit through the contacts 121, 122 also operates a lock which normally prevents the selecting operation of the hand lever 63 into alinement with the reverse gear slot, as 69, (Figure 4ª) and at the same time that the brake band 41 is applied. Although this lock is unlocked at all other times, when the contacts 121, 122 are moved to closed position and the clutches of the transmission are in neutral position or in the neutral zone, nevertheless the lock is always effective to prevent unintentional shifting into reverse gear from neutral, and due to the fact that the lock is correlated with the brake prevents clashing of the gears when the shift is being made from neutral to reverse.

The quick momentary closing of the throttle and the instantaneous release thereof momentarily reduces the torque of the engine but does not stall the engine because of the energy stored up in the fly wheel and other rotating parts. In the operation, the switch 121 is closed only momentarily and then it is immediately opened again, the interval the throttle is closed not being sufficient to stall the engine.

The electrically operated valve 65 may be of any suitable or well-known construction, that here shown comprising a casing A having a two-way or combined intake and exhaust valve B therein, this being provided with a normally closed intake valve head C and a normally open exhaust valve head D. The intake pipe 64 opens into the intake valve head end of the casing A and the outlet pipe leads from the casing between the valve heads or the seats for the valve heads. The valve B is normally held by a spring S with its intake head C closed and its exhaust head D open. The end of the casing A in which the exhaust valve head D is located has an outlet passage E. The valve is shown as opened against the action of the spring S by an electromagnet or solenoid M having its core N thrusting against the stem O on the valve B and extending to the outside of the casing A at the exhaust head end thereof. The windings of the magnet M are connected in the line 127 closed by the accelerator operated switch 112 when the accelerator pedal 113 is depressed into the full line position (Figure 4). The solenoid M is energized to actuate the valve B to close the exhaust valve head D and open the intake valve head C, so that the air passes through the pipe 64 into the valve casing A past the open intake valve head C and thence through the choke 64ª to the brake cylinder 96 to actuate the brake therein. This is an instantaneous operation, and upon the opening of the switch 112 by operating the foot pedal normally to or beyond idling position, the solenoid M is deenergized as the valve B returns to its normal position, so that the air is free to exhaust from the brake cylinder 96 back through the valve casing A past the now open exhaust valve head D through the outlet E.

The balking ring clutches are illustrated in Figures 5, 6, 7 and 8. The balking ring clutch 38 is of double construction and the balking ring clutch 39 is of single construction. The balking ring feature of either clutch may be of the construction shown in Figure 5 or that shown in Figure 7.

Each balking ring clutch comprises two sections, one of which is shiftable into and out of engagement with the other, these sections having toothed or jaw faces to be brought into engagement, and a balking ring acting to block the shifting of the shiftable section and the engagement of jaw faces, while the speeds of the clutch sections are different, and to rock to a position whereby the shiftable element is free to be shifted to engage the jaw clutch faces, when the speeds of the two sections cross or synchronize, either by decelerating the speed of the faster rotating section to and beyond that of slower running section, or accelerating the speed of the slower running section to that of the faster running section, or in case where one section is stationary at the time the shift is made, the speeds may be crossed by stopping the section that is rotating, and rocking momentarily in a retrograde direction by the brake band 41 and brake drum 40.

As best seen in Figure 5, 135 designates the shiftable section of the clutch, and 136 the other section, the section 136 being shown as formed as part of one of the gears, as the gear 29 in the gear box or the gear 34, the sections being provided respectively with teeth or jaws 137 and 138 to be brought into interlocking engagement. The shiftable section of the clutch 38 is double. The shiftable section is rotatable with the input shaft 4 and also slidable axially thereof. The jaw teeth of each section are alternately long and short and the ends of the long teeth chamfered, all to facilitate inter-engaging of the teeth.

139 designates the balking ring, it being here shown as having a conical friction face 140 coacting with a complemental face provided on a ring 141 rotatable with the clutch section 136, the ring 141 being shown as having peripheral teeth interlocking with internal teeth on the section 136. The balking ring is formed with internal projections 142 which form between them passages 143. The balking ring 139 rotates with the shaft 4 or the section 135 and is capable of a rocking or circumferential movement, within limits, relatively thereto. This is accomplished in the clutch here shown by interlocking the projections in peripheral recesses 144 (Figure 7) formed in a collar 145 which rotates as a unit with the shaft 4, the recesses 144 being wider than the projections 142, so that the balking ring has a rocking movement equal to the difference in the widths of the projections 142 and the recesses 144. The shiftable section is provided with peripheral projections or teeth 150 of a width to slidably fit the recesses 143 of the balking ring, and hence to lap and abut against the projections 142, when the ring is rocked in one direction or the other, so that the projections on the collar 145 abut against one side wall or the other of the recesses 143 of the balking ring (Figure 9). This occurs when one clutch section is rotating faster than the other. The balking ring is under a slight initial pressure to press its friction face 140 against the friction face of the ring 141, so that the balking ring is controlled by the section 136, by reason of the balking ring dragging with frictional contact on the ring 141, and hence is shifted by the ring 141 either into blocking position, when the speeds are different, or from blocking position to unblocking position, as the speeds cross.

In the form shown in Figure 5, the initial frictional engagement of the balking ring 139 with the ring 141 is effected by a camming action effected by a ring 151 having projections with cam or beveled faces 152 working in similarly shaped notches in a ring 153, these rings 151 and 153 being located between a rearwardly facing surface 154 on the balking ring 139 and a locking ring 155. The cam ring 151 is locked as by peripheral teeth with the internal teeth on the clutch section 136. The friction faces of the balking ring 139 and the ring 141 are normally engaged, and during relative rotation of the clutch sections 135 and 136, the cam ring 151 tends to carry the cam faces 152 up the inclines of the complemental notches, and hence press the balking ring 139 toward the ring 141.

In Figure 8, another form of means for pressing the balking ring into initial frictional engagement is shown. The means shown in Figure 8 consists of coacting wedge rings 156 and 157 having faces arranged to engage inclined-plane fashion, and these being located between abutments 158, 159 rotatable with the section 136, the abutment 158 having peripheral teeth slidably interlocking with the internal teeth of the section 136 and the abutment 159 being a lock ring. The wedge ring 157 is expansible under the action of the centrifugal force, that is, usually a split ring, so that under the centrifugal force, it expands radially outward, and by reason of cam faces coacting inclined-plane fashion, the balking ring 139 is thrust axially to the left, causing its friction face to engage with increased force and friction with the face of the friction ring 141, causing the balking ring to rock, within limits, and effect the locking of the blocking ring, when the speeds are different, and the unlocking of the balking ring when the speeds cross.

In the case of transmissions with large gears and high gear reduction, difficulty may be experienced in disengaging the clutching teeth with the force or pressure available on the shifting fork. To remedy this, the clutch teeth 137 and 138, as seen in Figure 10, may be made with a slight taper, so that the driving or drag force on the teeth will tend slightly to disengage them. By making the taper less than the angle of friction, the gears will not work out of gear, unless the disengaging force is applied to them through the shifting fork. This slight angular component merely helps the work of the fork or the shifting-out force. For example, with a friction angle of 5°, the taper may be made up to 3°.

The lock for preventing the shift into reverse is controlled by the same control means or pedal 113 which controls the opening of the valve 65 to apply the brake band 41, and comprises a locking bolt 166 which is operated by a pressure-operated motor, as a cylinder and piston 167, 168, the bolt engaging in an elongated notch or slot 169 formed in the rod 61ª on which the selector cam 61 is mounted. The cylinder 167 is connected by a conduit 170 to the conduit 64 or the section 164 thereof between the electrically operated valve 65 and the brake cylinder 96. The lock or bolt 166 is suitably guided in a collar 171 on the steering column 172 and the cylinder 167 also carried by the collar 171. The collar is also part of the support for the selector valve casing 62. The plunger or lock 166 blocks the selecting movement of the lever 63 in the cross-over slot 70 into alinement with the reverse slot 69, so that in making the shift to reverse, the driver must close the contacts 121, 122 by depressing pedal 113 in a retrograde direction beyond its normal starting position, in order to withdraw the lock or bolt 166 out of its locking position, preliminary to shifting into reverse gear. The operation of the piston 168 by the air pressure is against a returning spring 168ª.

The general operation is as follows: With the engine running at idling speed and the clutches in neutral, the runner element 2 will be rotating idly, and hence the driving members of the balking ring clutches rotating idly and the balking rings of the clutches will be in position to lock or block engagement of the toothed or jaw faces of the clutches. The operator operates the accelerator pedal 113 in a retrograde direction beyond normal idling position, closing the contacts 121, 122 of the switch 112, and as the balking rings are in neutral position, the contacts of the switch 111 are also closed. This operation of the accelerator 113 causes the electrically actuated valve 65 to be opened, permitting air to enter the cylinder 96, actuate the piston therein, and apply the brake band 41, and thus first stop the rotation of the shaft 4 and the runner element 2 and then rotate or rock it momentarily in a retrograde direction, causing the speeds to cross and the balking ring of the selected clutch 38 or 39 to be unlocked, and hence permit the piston 73 to be actuated by the air pressure tending to actuate it, and shift the jaw face of the shiftable section of the selected clutch into engagement with the jaw face of the other section. The driver then operates the lever 63 to operate the valve-operating cam 61 but the operation of the piston 73 is blocked by the fact that the balking ring is in blocking or locking position. Immediately upon the movement of the piston 73, the circuit through the electrically operated valve 65 is broken by the switch 111, as this switch is operated by the shaft or rod 51 actuated by the piston 73, so that now the runner element 2 and input shaft 4 are free to rotate with the impeller element 1. Then by operating the accelerator pedal in the normal manner, the speed of the vehicle may be increased, as desired, in the usual manner. When a shift is being made while the vehicle is in motion, the lever 63 is operated in its selecting and shifting movement, and the balking ring of the clutch to be engaged by the shifting operation may be unlocked or the speeds crossed by accelerating or decelerating the engine. When a shift is being made from a lower speed to a higher speed, the shift may be speeded up by operating the accelerator 113 in a retrograde direction beyond its normal idling position, and thereby momentarily applying the brake, although, in this operation, the brake will act to merely retard the rotation of the shaft 4, and the driving clutch sections of the balking ring clutches, the driven sections of such clutches rotating under the driving action of the momentum of the vehicle. Hence, by thus quickly decelerating the engine or runner element 2, when a shift is being made from a lower to a higher speed, the time period in which the speeds will cross is greatly lessened.

What we claim is:

1. In a transmission mechanism, the combination of an engine having a throttle valve, a hydraulic coupling of the blade or vane type which includes an impeller element and a runner element, a change-speed transmission gearing including selectively operable balking ring clutches, each including driving and driven sections, one of which is shiftable axially, a brake on the transmission gear operable to effect crossing of the speeds of the driving and driven sections of the selected balking ring when the speed of the driven section is zero preliminary to a shifting-in of the shiftable section, a driver-controlled, power-operated clutch selecting and shifting mechanism comprising shift rods, for the clutches, a source of fluid under pressure, a fluid operated motor for actuating the selected shift rod, branch conduits leading to the fluid operated motor, a valve casing connected in said branch conduits and having normally closed two-way valves therein individual to the branch conduits, a driver-operated member having a selecting and shifting movement to successively select and operate a predetermined valve, transfer valve mechanism for controlling the flow of motive fluid to the fluid motor, a fluid operated motor for operating the transfer valve mechanism, the valve mechanism operating to control the flow of the fluid to successively operate the fluid motor for the transfer valve mechanism and the fluid motor for the shift rods, a driver-operated accelerator connected to the throttle of the engine, a fluid motor for operating said brake, an additional branch conduit having a normally closed two-way valve therein leading to the brake operating fluid motor, and means operable by the driver-operated accelerator member when operated in a retrograde direction beyond the normal engine idling position thereof for opening the valve in the additional conduit to rapidly decelerate the engine.

2. In a transmission mechanism, the combination of an engine having a throttle, a hydraulic coupling of the blade or vane type which includes an impeller element actuated by the engine and a runner element, a change-speed transmission gearing including selectively operable balking ring clutches, each including driving and driven sections, one of which is shiftable axially, a brake for the input shaft operable to effect crossing of the speeds of the driving and driven sections of the selected balking ring clutch when the speed of the driven section is zero preliminary to a shifting-in of the shiftable section of any one of the balking ring clutches, a driver-controlled, power-operated clutch selecting and shifting mechanism comprising shift rods for the clutch, a source of fluid under pressure, fluid-operated motor means for actuating the selected shift rod, branch conduits leading to the fluid-operated motor means, a valve casing connected to said conduits and having normally closed two-way valves therein individual to the branch conduits, a driver-operated valve member having a selecting and shifting movement to succcessively select and operate a pre-determined valve, automatic transfer valve mechanism in said branch conduits for controlling the flow of motive fluid to the fluid-motor means, a fluid operated motor for operating the automatic transfer valve mechanism to successively control the flow of fluid, first to the motor for the transfer valve mechanism and then to the fluid-motor means for the shift rods, a driver-operated accelerator connected to the throttle of the engine, a fluid motor for operating said brake, an additional branch conduit having a normally closed two-way valve therein leading to the brake operating fluid motor, and means operable by the driver operated accelerator member when operated beyond the normal engine idling position thereof to open the valve in the additional conduit.

3. In a transmission mechanism, the combination of an engine having a throttle, a hydraulic coupling of the blade or vane type which includes an impeller element actuated by the engine and a runner element, a change-speed transmission gearing including selectively operable balking ring clutches, each including driving and driven sections, one of which is shiftable axially, a brake for the input shaft operable to effect crossing of the speeds of the driving and driven sections of the selected balking ring clutch when the speed of the driven section is zero preliminary to a shifting-in of the shiftable section of any one of the balking ring clutches, a driver-controlled, power-operated clutch selecting and shifting mechanism comprising shift rods for the clutch, a source of fluid under pressure, fluid-operated motor means for actuating the selected shift rod, branch conduits leading to the fluid-operated motor means, a valve casing connected to said conduits and having normally closed two-way valves therein individual to the branch conduits, a driver-operated valve member having a selecting and shifting movement to successively select and operate a predetermined valve, automatic transfer valve mechanism in said branch conduits for controlling the flow of motive fluid to the fluid-motor means, a fluid operated motor for operating the automatic transfer valve mechanism to successively control the flow of fluid first to the motor for the transfer valve mechanism and then to the fluid-motor means for the shift rods, a driver-operated accelerator connected to the throttle of the engine, a fluid motor for operating said brake, an additional branch conduit having a normally closed two-way valve therein leading to the brake operating fluid motor, and means operable by the driver operated accelerator member when operated beyond the normal engine idling position thereof to open the valve in the additional conduit, and means operable by the shifting of the selected shift rod to close the valve in the additional conduit.

4. In a transmission mechanism, the combination of an engine having a throttle, a hydraulic coupling of the blade or vane type which includes an impeller element actuated by the engine and a runner element, a change-speed transmission gearing including input and output shafts, gearing between the same including selectively operable balking ring clutches, each including driving and driven sections, one of which is shiftable axially, the input shaft being connected to the runner element, means for selecting and shifting the shiftable sections including shift rods, a brake for the input shaft operable to effect the crossing of the speeds of the driving and driven sections of the selected balking ring clutch when the speeds of the driven sections are zero preliminary to shifting-in of the shiftable section, a fluid motor for operating the brake, a source of supply for fluid under pressure, and a conduit connecting the source and the motor, a two-way valve normally closing said conduit, a driver-operated accelerator connected to the throttle of the engine and movable in a retrograde direction beyond its position assumed when the throttle is in normal idling position, means operable by the movement of the accelerator in a retrograde direction beyond normal idling position to open said valve, when the balking ring clutches are in neutral, and means operable by the shifting of the selected shiftable section out of neutral position to close said valve and release the brake.

5. In a transmission mechanism, the combination of an engine having a throttle, a hydraulic coupling of the blade or vane type which includes an impeller element actuated by the engine, and a runner element, a change-speed transmission gearing including input and output shafts, trains of gears between the same including selectively operable clutches, one of the trains being a reverse train, each clutch including driving and driven sections, one of which is shiftable axially, the input shaft being connected to the runner element, means for selecting and shifting the shiftable section including shift rods, a brake for the input shaft operable to effect the crossing of the speeds of the driving and driven sections of the selected clutch when the speeds of the driven sections are substantially zero preliminary to shifting-in of the shiftable section, a lock operable to prevent selecting movement of said mechanism into position to select reverse gear, a fluid motor for withdrawing the lock, a source of supply for fluid under pressure, a conduit connecting the source and the motor, a valve normally closing said conduit, a driver-operated accelerator connected to the throttle of the engine and operable in a retrograde direction beyond engine idling position, means operated by the movement of the accelerator in a retrograde direction beyond normal engine idling position to open said valve when the clutches are in neutral position.

6. In a transmission mechanism, the combination of an engine having a throttle, a hydraulic coupling of the blade or vane type which includes an impeller element actuated by the engine and a runner element, a change-speed transmission gearing including input and output shafts, trains of gears between the same including selectively operable clutches, one of the trains being a reverse train, each clutch including driving and driven sections, one of which is shiftable axially, the input shaft being connected to the runner element, means for selecting and shifting the shiftable sections including shift rods, a brake for the input shaft operable to effect the crossing of the speeds of the driving and driven sections of the selected clutch when the speeds of the driven sections are substantially zero preliminary to shifting-in of the shiftable section, a lock operable to prevent selecting movement of said mechanism into position to select reverse gear, fluid motors for operating the brake and withdrawing the lock respectively, a source of supply for fluid under pressure, a conduit connecting the source and said motors, a two-way valve normally closing said conduit, a driver operated accelerator connected to the throttle of the engine and operable in a retrograde direction beyond its position assumed when the throttle is in idling position, and means operated by the movement of the accelerator in a retrograde direction beyond normal idling position to open said valve, and hence energize the motors for the brake and the lock when the clutches are in neutral position.

7. In a transmission mechanism, the combination of an engine having a throttle valve, a hydraulic coupling of the blade or vane type which includes an impeller element and a runner element, a change-speed transmission gearing including input and output shafts, trains of gears between the same including selectively operable clutches, one of the trains being a reverse train, each clutch including driving and driven sections, one of which is shiftable axially, a brake on the transmission gearing operable to effect crossing of the speeds of the driving and driven sections of the clutches, when the speed of the driven section is zero preliminary to shifting-in of the shiftable section, a driver-controlled power-operated clutch selecting and shifting mechanism comprising shift rods, for the clutches, a lock for normally preventing selecting of the reverse gear train of the clutch controlling the reverse gear train, a source of fluid under pressure, a fluid operated motor for actuating the selected rod, branch conduits leading to the fluid operated motor, a valve casing connected in said branch conduits and having normally closed two-way valves therein individual to the branch conduits, a driver-operated member having a selecting and shifting movement to successively select and operate a predetermined valve, transfer valve mechanism for controlling the flow of motive fluid to the fluid motor, a fluid operated motor for operating the transfer valve mechanism, the transfer valve mechanism operating to control the flow of fluid to successively operate the motor, for the transfer valve mechanism and the motor for the shift rods, a driver-operated accelerator connected to the throttle of the engine, a fluid motor for operating said brake, a fluid motor for operating said lock, an additional branch conduit having a normally closed valve therein leading to the brake and the lock motor, and means operable by the driver-operated accelerator member when operated in a retrograde direction beyond the normal engine idling position thereof to open the valve in the additional conduit and thus apply the brake and unlock the lock.

8. The combination set forth in claim 5 in which the valve in the conduit is an electrically-operated valve and the means for operating it comprises two electric switches connected in series in circuit with the electrically-operated valve, one switch being normally open and movable to closed position by the movement of the accelerator in a retrograde direction beyond normal idling position, and the other switch being normally closed and operable to open position by the shifting of the selected balking ring clutch out of neutral position.

9. In a transmission mechanism, the combination of an engine having a throttle, a hydraulic coupling which includes an impeller element actuated by the engine and a runner element, a change speed transmission gearing including input and output shafts and gearing between them, and also including selectively operable balking ring clutches, one on the input shaft, and another on the output shaft, each clutch including driving and driven sections, and the driving section of the clutch on the output shaft being geared to the input shaft, one of the sections of each balking ring clutch being shiftable axially into and out of engaged position, a brake for the input shaft operable to effect the crossing of the speeds of the driving and driven sections of the selected balking ring clutch preliminary to the shifting in of the shiftable section of any one of the balking ring clutches, a driver-controlled, power-actuated, clutch selecting and shifting mechanism comprising shifters for the clutches, a source of fluid under pressure, fluid operated motor means for operating the selected shifter, branch conduits leading to the fluid operated motor means, a valve casing connected to said conduits and having normally closed two-way valves therein individual to the branch conduits, a driver-operated valve member having a selecting and shifting movement to select and shift a predetermined valve, an automatic transfer valve mechanism in the branch conduits for controlling the flow of fluid to the fluid motor means, a second fluid operated motor for operating the automatic transfer valve mechanism to successively control the flow of fluid first to the second motor and then to the fluid motor for the shifters, a driver-operated accelerater connected to the throttle of the engine, a fluid motor for operating said brake, an additional branch conduit having a normally closed two-way valve therein leading to the brake operating fluid motor, and means operable by the driver-operated accelerater member when operated to a predetermined closed position to operate the valve in the additional conduit.

10. In a transmission mechanism, the combination of a hydraulic coupling which includes an impeller element and a runner element, and a change speed transmission gearing including input and output shafts, the input shaft being rotatable with the runner element, gearing between the input and output shafts including selectively operable balking ring clutches, each clutch including driving and driven sections, one of which is shiftable axially, and a brake operable to stop the input shaft and reverse it momentarily to effect the crossing of the speeds of the sections of the selected clutch and thereby facilitate the engagement of the sections of the selected clutch, driver-controlled, power-operated selecting and shifting mechanism for the clutches, and power-operated means for operating the brake operated by the accelerator of the engine, when operated to close the engine throttle to a predetermined closed position.

CARL D. PETERSON.
ALBERT H. DEIMEL.